(No Model.)
R. G. BROWN.
SYNCHRONOUS MULTIPLEX TELEGRAPH.
No. 423,903. Patented Mar. 25, 1890.
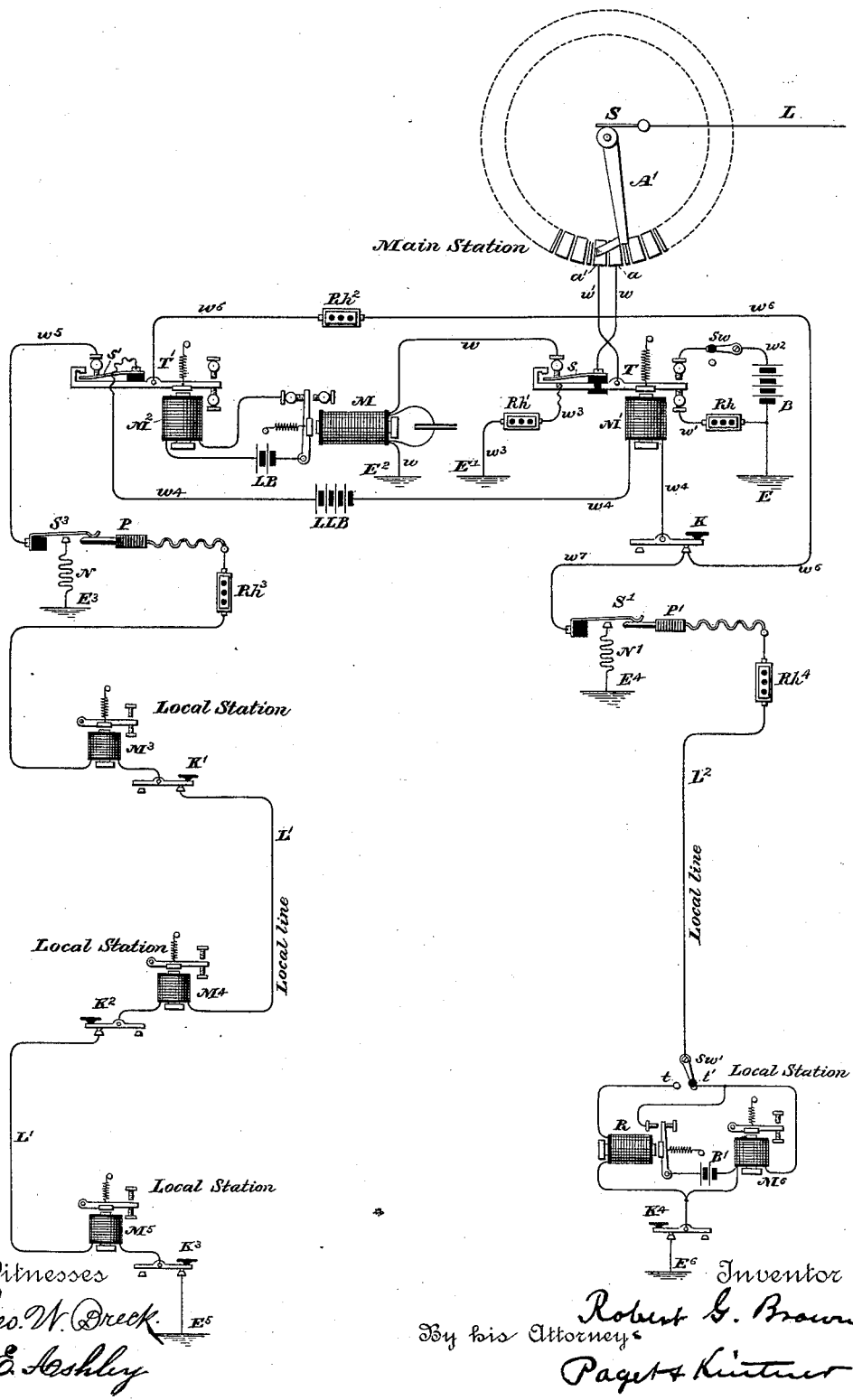

UNITED STATES PATENT OFFICE.

ROBERT G. BROWN, OF BROOKLYN, NEW YORK.

SYNCHRONOUS MULTIPLEX TELEGRAPH.

SPECIFICATION forming part of Letters Patent No. 423,903, dated March 25, 1890.

Application filed July 3, 1889. Serial No. 316,466. (No model.)

*To all whom it may concern:*

Be it known that I, ROBERT G. BROWN, a citizen of the United States, residing at Brooklyn, in the county of Kings and State of New York, have made a new and useful invention in Telegraphy, of which the following is a specification.

My invention relates particularly to that branch of the art of telegraphy known as "synchronous multiplex telegraphs," in which several operators located at one station are enabled to communicate with or transmit to one of a like number of operators located at a distant outlying station, and over a single main-line conductor—such, for instance, as is disclosed in my prior patents, No. 355,860, granted January 11, 1887, and No. 304,893, granted June 14, 1887; and its object is to provide telegraphic systems of the character named with apparatus at each main or central station for connecting the instruments of the several operators at said station with outlying local lines, so that there shall be such a general system of intercommunication that any two operators may intercommunicate, whether located at the main or local stations. I have disclosed and claimed such a system of intercommunication as this, broadly, in a prior application, filed by me in the United States Patent Office on the 27th day of April, 1889, bearing Serial No. 308,879, but as applied to an open-circuit system.

It is my special object to here disclose and claim such an apparatus as adapted to a closed-circuit system, thereby bringing about a great saving of battery and avoiding other objectionable features at once obvious to those skilled in the art.

It is the further object of my invention to so arrange the apparatus of the outlying local operators and switch-connections at the central station that any one of the said operators may communicate directly through the main station to any other operator at the distant station on a simple closed Morse circuit in the event of any failure of or disturbance to the synchronous multiplex apparatus.

I accomplish these objects by the use of the apparatus hereinafter disclosed, but particularly pointed out in the claims which follow this specification.

Referring to the drawings, which illustrate my invention diagrammatically, L is the main line, and A' a trailer of one of the well-known systems of multiplex synchronous instruments, the duplicate of all the apparatus shown being located at the distant main station. (Not shown.) This special form of apparatus in which all of the signals transmitted are sent on one set or group of segments $a'$ and received on a separate set or group of segments $a$ is disclosed and claimed in a prior application filed by me in the United States Patent Office, Serial No. 194,303, March 6, 1886, and I make no claim to this feature here.

It will be understood that there are used in practice four (more or less) sets of apparatus at each main station, similar to that here shown and described, the connections for the various groups of the synchronous apparatus being obvious in view of the prior state of the art.

T is the main-line transmitter, operated by a local electro-magnet M', central-station key K, and local-line battery LLB.

T' is a repeating-relay for repeating from the distant station through the home station to the outlying local lines, and $M^2$ is the local central-station magnet for operating it through the agency of local battery LB, said magnet also acting as a local sounder for the central-office operator.

B is the main-line or transmitting battery, normally on an open-earth circuit $w^2$, earthed at E.

R$h$, R$h'$, and R$h^2$ are adjustable rheostats for equalizing the various circuits.

L' and $L^2$ are outlying local lines having the usual Morse keys K' $K^2$, &c., and electro-magnets $M^3$ $M^4$, &c., said lines being earthed at $E^5$ and $E^6$, respectively.

N and N' are rheostats on normally-open earthed circuits at $E^3$ and $E^4$, equal to the resistance of the lines they are adapted to replace.

R is a Morse relay, with circuit and switch connections arranged for adapting the local line for use over the main line L as a simple Morse circuit in the event of any accident to the synchronous apparatus.

I will now describe the operation of this apparatus. The keys at all the stations are shown closed, and the local-line battery LLB, which controls the outlying local instruments on local lines L' and L², is closed as follows: by wire $w^4$, spring S' of transmitter T', wire $w^5$, spring $S^3$, plug P, rheostat $Rh^3$, local line L', magnets $M^3$, $M^4$, and $M^5$, and keys K', K², and K³ to earths $E^5$ and $E^6$, key K⁴, magnet $M^6$, switch $Sw'$, local line L², rehostat $Rh^4$, plug P', spring S', wire $w^7$, main-station key K, magnet M', and wire $w^4$ to starting point. This holds all of the armatures closed for the magnets named. The same condition of affairs exists for the corresponding sets of instruments at the distant station (not shown) and there is no transmitting-battery at all on the main line so long as the keys remain in this position, the usual correcting impulses being sent to line for synchronism in the usual way in apparatus of this nature. If now the distant operator opens his key, his transmitter T immediately connects the battery B at that end of the line to circuit and sends a signal, which, acting in accordance with the principle named in my prior application above referred to, transmits said impulse through the segment $a$, the arm A having advanced that far, and hence this impulse is sent to earth through wire $w$, spring S, and central-station relay M, thereby drawing forward the armature of relay M and breaking the circuit of local battery LB, which permits the armature of the repeating-relay T' to fall on its back-stop, thereby breaking the local lines L' and L², thus permitting all the instruments in those lines to respond. The local transmitting-circuit of the battery LLB is not broken, however, but is transferred by spring S', through the transmitter T', into a local all-wire circuit, including wire $w^4$, magnet M', key K, wire $w^6$, and rheostat $Rh^2$, thereby preserving continuity of the circuit through the repeating-relay T' and preventing any false signal from battery B. Thus all the operators on the local lines L' and L² receive signals from the distant stations at the same instant.

Should the central-office operator K or any operator on either of the local lines L' or L² desire to signal, it will be seen that signals will at once be sent on opening any key to all operators on the two local lines and to the corresponding main-line operator at the distant station, as well as to all operators on local lines L' and L² at that station—that is to say, all of the operators on the home local lines hear the signals through the agency of battery LLB, while those at the distant station hear through the agency of the main battery B and the distant local-line battery LLB. (Not shown.)

Should the synchronous apparatus fail and it be desired to use the main line L as a simple Morse circuit for outlying local lines, either of the plugs P or P' could be inserted between the spring S and rotary arm A', both of said lines having been provided with the apparatus shown at the outlying end of the local line L², and the switch $Sw'$ having been turned on the point $t$, so that the relay R is in circuit and battery B' connected into a local circuit for magnet $M^6$, it being understood that a main-line battery is looped in circuit in the usual way at either or both central stations in the well-known way for Morse circuits.

It will thus be seen that with the apparatus disclosed I am enabled to connect a system of synchronous multiplex or analogous main-line operators' instruments with outlying local lines and to so arrange that any of the operators on any of said lines may intercommunicate at the will of the station operators, or a series of such lines may be so connected as to receive common news—as, for instance, brokers or bankers or persons desiring market quotations of any kind in common.

Having thus described my invention, what I claim, and desire to secure by Letters Patent of the United States, is—

1. In a system of multiplex synchronous telegraphy, the combination of multiplex-transmitters and receivers at each end of a single main line with main-line signaling-batteries, also located at each end of the line, but normally open, a single repeating-battery for each pair of outlying local lines normally closed therethrough, and a repeating-relay, one for each apparatus, said relay having circuit-connections with outlying local lines, including transmitters and receivers, substantially as described.

2. In a system of synchronous multiplex telegraphy, the combination at each end of a single main line of a series of transmitters having their armatures held normally on their front stops with a single main-line transmitting-battery, said battery being connected to earth and normally on open circuit at the back-stop of the transmitting-armatures, with a main-line relay for each transmitter, and a local battery controlled by said relay, and outlying pairs of local lines, each of said pairs of lines including a normally-closed transmitting-battery, and transmitters and receivers with connections, as described, for causing them to transmit and receive over the main line, substantially as described.

3. In a system of synchronous multiplex telegraphy, the combination of a series of transmitters having a normally-open transmitting-battery with local-line batteries, one for each pair of outlying local lines and normally closed therethrough for controlling said transmitters, a series of receiving-relays, one for each transmitter, and a repeating-relay with connections to outlying local circuits, substantially as described.

4. In a system of synchronous multiplex telegraphy, the combination of the following elements: a series of transmitters and receivers located at each end of a single main line, normally-open main-line batteries, one at each end of said line, a receiving-instrument, one for each transmitter, a repeating-relay, one for each receiver, a repeating-battery, one for each repeating-relay, and a series of outlying local lines, two for each local-line battery, said local lines including transmitters and receivers, each of said local-line batteries being normally closed through an individual pair of outlying local lines, substantially as described.

5. In a system of synchronous multiplex telegraphy, the combination of an all-wire circuit at each central station, including a local signaling-battery having connections with outlying earthed local lines, with normally-open main-line batteries at each central station, and connections, as described, whereby the local-line batteries are transferred from the outlying earthed circuits to the local all-wire circuits, all of the signaling-batteries being located at the central station at each end of the main line, substantially as described.

6. In a system of synchronous multiplex telegraphy adapted for use on the closed-circuit principle, the combination of normally-open transmitting-batteries with normally-closed local-line batteries, including in their circuits the electro-magnets which control the main-line transmitters, and normally-earthed outlying local lines, two for each main-line transmitter, having transmitters and receivers, all of the signaling-batteries being located at the central station, substantially as described.

7. In a system of synchronous multiplex telegraphy, the combination of the following elements: a series of transmitters and receivers having a single normally-open main-line transmitting-battery located at each end of the line, a main-line receiver-instrument for each transmitter, a repeating-relay for each receiver, a repeating-battery for each receiving-relay, a pair of outlying local lines for each repeating-relay, the repeating-batteries being normally closed through each pair of outlying local lines, and the electro-magnet which controls the transmitter, substantially as described.

8. In a telegraphic system, the combination of transmitters and receivers located at each end of a main line, normally-open main-line batteries, a pair of outlying local lines for each transmitter, a repeating-battery for each pair of lines and normally closed therethrough, a repeating-relay for each repeating-battery, a local all-wire circuit, including in its circuit the main-line transmitter-magnet and the armature of the repeating-relay, and connections, as described, whereby messages are transmitted from either end of the main line or from any station on either of the pairs of outlying local lines and received at all of said stations, substantially as described.

ROBERT G. BROWN.

Witnesses:
C. J. KINTNER,
ANNIE DUNNELL.